United States Patent
Stiefvater et al.

[11] Patent Number: 5,916,112
[45] Date of Patent: Jun. 29, 1999

[54] GUIDE LINK FOR A ROTATABLE HARVESTER GEARBOX

[75] Inventors: Thomas L. Stiefvater, Ephrata; James T. Clevenger, Jr., Lancaster; Steven J. Campbell, New Holland; Kenneth R. Underhill, Strasburg, all of Pa.

[73] Assignee: New Holland North America, Inc., New Holland, Pa.

[21] Appl. No.: 09/018,762

[22] Filed: Feb. 5, 1998

Related U.S. Application Data

[60] Provisional application No. 60/041,531, Mar. 21, 1997.

[51] Int. Cl.⁶ .......................... A01D 34/76; A01D 75/18
[52] U.S. Cl. .............................. 56/15.2; 56/15.6; 56/218; 56/DIG. 14
[58] Field of Search ............................... 56/6, 15.1, 15.2, 56/15.6, 15.7, 13.6, 17.5, 16.4 B, 16.4 C, 218, 228, DIG. 6, DIG. 14

[56] References Cited

U.S. PATENT DOCUMENTS

| | | | |
|---|---|---|---|
| 2,789,705 | 4/1957 | Eberly | 214/42 |
| 2,864,517 | 12/1958 | Dickenshied | 214/42 |
| 4,858,418 | 8/1989 | von Allwoerden | 56/15.2 X |
| 5,272,859 | 12/1993 | Pruitt | 56/15.2 |

FOREIGN PATENT DOCUMENTS

| | | |
|---|---|---|
| 108592 | 10/1939 | Australia . |
| 0678237 | 4/1995 | European Pat. Off. . |
| 9414597 | 9/1984 | Germany . |
| 4019948 | 1/1991 | Germany . |

OTHER PUBLICATIONS

Niemeyer RO 301 GK Rotary Mower–Conditioner described in a Declaration by Assignee—On–Sale at least as early as Jan. 1991.

*Primary Examiner*—Terry Lee Melius
*Attorney, Agent, or Firm*—Larry W. Miller; J. William Stader; Frank A. Seemar

[57] ABSTRACT

A guide link mechanism is supported from the draft tongue of a pull-type harvester and connected to the gearbox mounted on the crop harvesting header to provide rotational power thereto wherein the guide link is supported from a sliding mechanism mounted on the tongue that accommodates the changes in distance in respective points associated with the pivotal movement of the draft tongue about a different pivot center than the gearbox. The sliding mechanism includes a bracket affixed to the underside of the draft tongue and low friction inserts, such as nylon, phenolic, urethane or polyethylene inserts, carried by the bracket. The guide link is connected to a slider plate that is slidably received by the phenolic inserts to permit a sliding movement thereof relative to the draft tongue. The rearward end of the guide link is pivotally connected to the gearbox to accommodate vertical movements of the crop harvesting header relative to the draft tongue. The guide link mechanism effects pivotal movement of the gearbox in response to the pivotal movement of the draft tongue to minimize angular deflection of the universal joints in the drive line supported on the draft tongue to deliver rotational power to the gearbox.

15 Claims, 6 Drawing Sheets

GUIDE LINK FOR A ROTATABLE HARVESTER GEARBOX

This application claims benefit of Provisional Application No. 60/041,531 filed Mar. 21, 1997.

BACKGROUND OF THE INVENTION

Pull-type harvesting implements have been utilized for harvesting operations for many years. These harvesting implements can have a variety of configurations, but generally have a transverse frame to which is connected a pivotal draft member or tongue. The draft tongue extends forwardly of the transverse frame for attachment to a prime mover, such as a tractor, which provides all operative power for the implement. The tractor provides motion to the implement, as well as power for operating the harvesting components supported by the implement frame.

One such pull-type configuration is the pivot tongue windrower, such as seen in U.S. Pat. No. 5,272,859, issued to Martin E. Pruitt, et al on Dec. 28, 1993, the descriptive portions of which are incorporated herein by reference. This '859 patent also teaches the mounting of a central gearbox on the header such that the gearbox is movable relative to the implement frame. This gearbox is rotatable about a generally vertical axis so that the input shaft into the gearbox can generally follow the pivotal movement of the centrally pivoted draft tongue.

To accomplish the coordinated movement of the rotation of the gearbox with the pivotal movement of the tongue, the '859 patent discloses a telescoping steering mechanism that interconnects the tongue and the gearbox such that the gearbox is rotated in response to the transverse movement of the draft tongue. The telescopic action of the steering mechanism is operable to accommodate the changes in distance of the respective connecting points thereof with the tongue and the gearbox as the tongue swings from side to side, due to the different horizontally spaced pivot centers of the draft tongue and the gearbox. The telescopic action of the steering mechanism, along with a generally horizontal pivot or gimble, also allows the steering mechanism to follow the vertical movement of the header relative to the tongue without restricting the movement of the header or the draft tongue.

This steering mechanism, as taught by the '859 patent, suffers from operational problems associated with vibration due to the loosely fitting telescopic parts and wear of the sliding parts. The implement, as can be seen in the drawings of the '859 patent, is provided with rotatable cutting mechanism and crop conditioning mechanism. The operation of these harvesting components provides a substantial amount of vibration within the implement. Since the steering mechanism is loosely constructed to permit the necessary relative pivotal movements of the header and the draft tongue, this operational vibration causes noise and wear in the parts of the steering mechanism. Furthermore, the looseness of the parts and the sliding action therebetween causes substantial wear in the steering mechanism, resulting in the increased likelihood of failure.

Furthermore, the mechanism of the '859 patent is subject to side forces from the torque applied to the gearbox by the drive mechanism and the cutterbar forces within the crop harvesting header on which the rotatable gearbox is mounted. These external forces place a side load on the steering link and can result in a binding of the telescoping tubes forming the steering link, which results in a thrust load on the gearbox and the connecting apparatus, particularly when the header rises and the telescopic tubes telescope together. These telescoping tubes also present a hinge-like degree of freedom which can contribute to the vibration in the apparatus.

Utilization of a hydraulic master/slave cylinder arrangement, with the master cylinder associated with the pivoted draft tongue and the slave cylinder effecting a corresponding movement of the rotatable gearbox, is also subject to the side forces from the torque applied to the gearbox by the drive mechanism and the cutterbar forces within the crop harvesting header on which the rotatable gearbox is mounted. A variation of the master/slave hydraulic arrangement would be single-acting master and slave cylinders coupled with a spring to oppose the slave cylinder attached to the gearbox. A problem encountered with such a system is that the external forces can overcome the spring coupled with the hydraulic mechanism and force the gearbox from the correct position, causing the gearbox input shaft to bend. Another problem encountered with the master/slave hydraulic mechanism is that hydraulic fluid leaks across the cylinder pistons causing the slave cylinder to fall out of synchronization with the master cylinder and, thereby, possibly resulting in the gearbox being turned at an improper angle.

SUMMARY OF THE INVENTION

It is an object of this invention to overcome the aforementioned disadvantages of the prior art by providing a rigid guide link slidably mounted on the tongue of a pull-type harvester to control pivotable movements of a gearbox in conjunction with the pivotal movements of the tongue.

It is another object of this invention to provide a guide link mechanism supported from the draft tongue of a pull-type harvester and connected to a gearbox associated with the transfer of rotational power to the crop harvesting header carried on the pull-type harvester so that the gearbox will rotate with the pivotal movement of the draft tongue.

It is a feature of this invention that the drive line supported by the draft tongue to deliver rotational power to the gearbox is retained in substantial alignment with the draft tongue.

It is an advantage of this invention that the universal joints in the driveline supported by the draft tongue of a pull-type harvester are subjected to minimal angular deflection.

It is another advantage of this invention that the life of the drive line components is increased.

It is another feature of this invention that the guide link is a unitary member with any necessary changes in distance between respective points upon pivotal movement of the draft tongue being accommodated by a sliding mechanism disposed between the draft tongue and the guide link.

It is still another advantage of this invention that the guide link mechanism is not subjected to vibrational characteristics associated with telescopic linkage members.

It is yet another advantage of this invention that the unitary guide link is not subjected to binding associated with telescopic linkage members.

It is still another feature of this invention that the sliding mechanism utilizes low-friction guide inserts to minimize forces associated with telescopic linkage members.

It is yet another feature of this invention that the fore-and-aft ends of the sliding mechanism are open.

It is a further advantage of this invention that the sliding mechanism is self-lubricating and self-cleaning from the movement of the pivot plate through the low-friction guide inserts.

It is still another object of this invention to provide a guide link mechanism to control the pivotal movement of a gearbox in response to the pivotal movement of an associated draft tongue of a pull-type harvester which is durable in construction, inexpensive to manufacture, carefree of maintenance, facile in assemblage, and simple and effective in use.

These and other objects, features, and advantages are accomplished according to the instant invention by providing a guide link mechanism supported from the draft tongue of a pull-type harvester and connected to the gearbox mounted on the crop harvesting header to provide rotational power thereto wherein the guide link is supported from a sliding mechanism mounted on the tongue that accommodates the changes in distance in respective points associated with the pivotal movement of the draft tongue about a different pivot center than the gearbox. The sliding mechanism includes a bracket affixed to the underside of the draft tongue and low friction inserts, such as nylon, phenolic, urethane or polyethylene inserts, carried by the bracket. The guide link is connected to a slider plate that is slidably received by the phenolic inserts to permit a sliding movement thereof relative to the draft tongue. The rearward end of the guide link is pivotally connected to the gearbox to accommodate vertical movements of the crop harvesting header relative to the draft tongue. The guide link mechanism effects pivotal movement of the gearbox in response to the pivotal movement of the draft tongue to minimize angular deflection of the universal joints in the drive line supported on the draft tongue to deliver rotational power to the gearbox.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
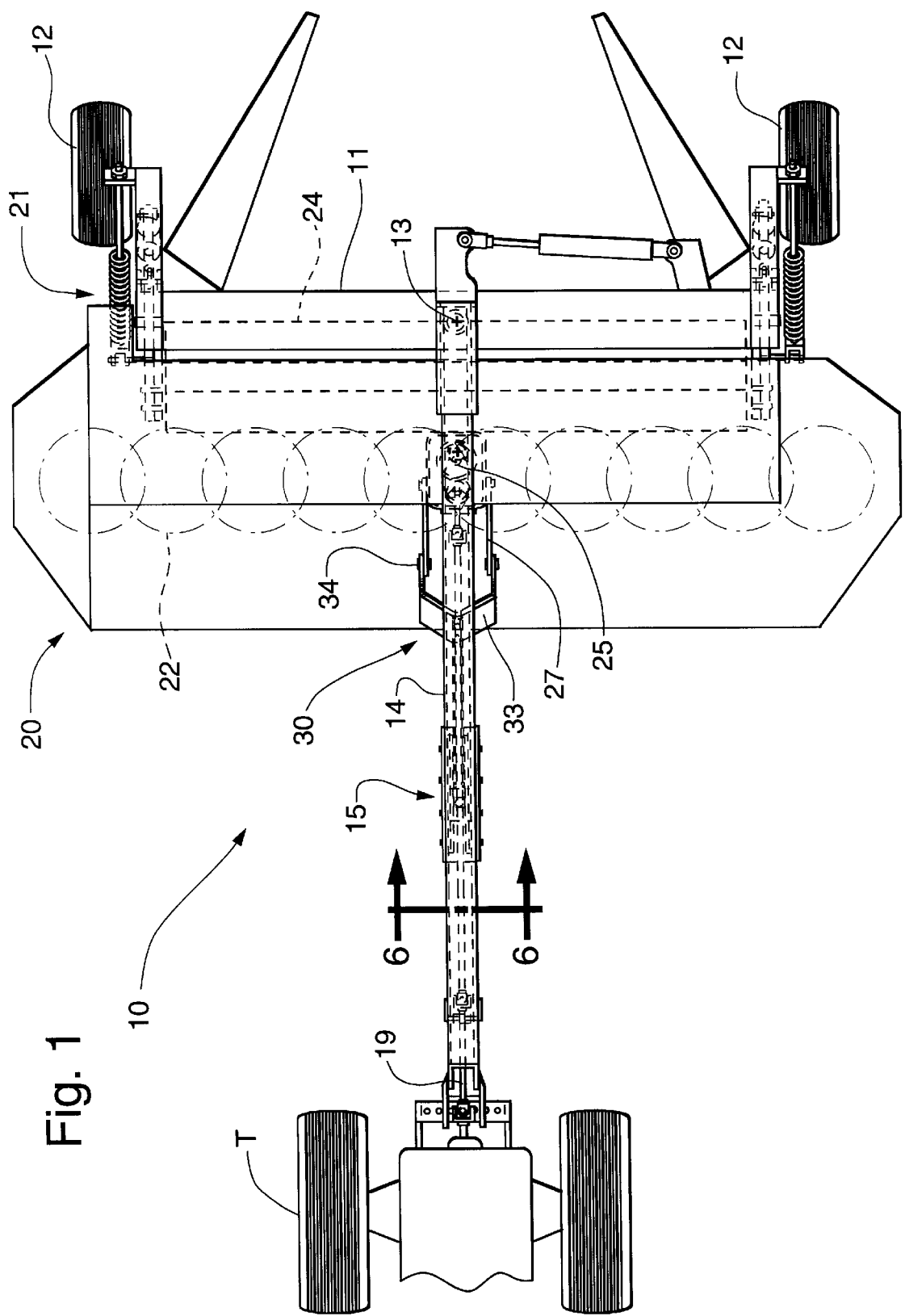
FIG. 1 is a top plan view of a crop harvesting machine incorporating the principles of the instant invention, the crop harvesting machine being shown connected to a tractor.
Figure 2:
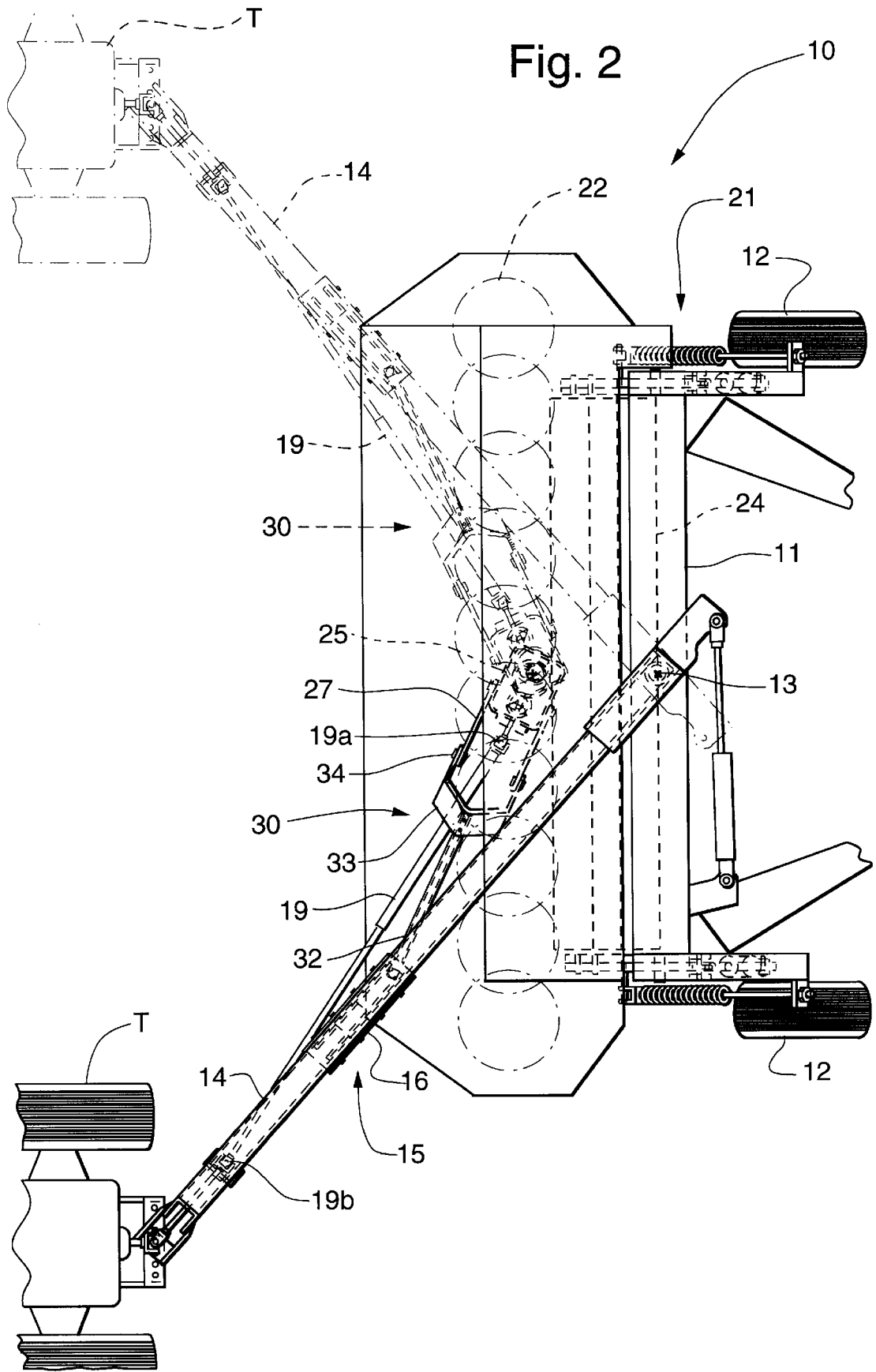
FIG. 2 is a top plan view of the crop harvesting machine shifted into a harvesting position to the right of the tractor, the orientation of the tractor, drawbar and drive line when the crop harvesting machine is shifted into a harvesting position to the left of the tractor being shown in phantom.

Referring now to FIGS. 1–5, the preferred embodiment of the instant invention can be realized by one skilled in the art. Any left and right references are used as a matter of convenience and are determined by standing at the rear of the machine facing the hitch portion of the draw bar into the normal operative direction of travel. The crop harvesting machine 10 is of a centrally pivoted tongue configuration and includes a centrally pivoted draft tongue or draw bar 14 extending forwardly of the transverse implement frame 11, which is provided with conventional wheels 12 to make the machine 10 mobile over the surface of the ground G.

A crop harvesting header 20 is suspended from the transverse frame 11 in a conventional manner for generally vertical movement relative to the frame 11 and the draft tongue 14. The header 20 includes conventional harvesting components, including a cutterbar 22, preferably in a known disc configuration, for severing standing crop material, and a conditioning mechanism 24, preferably of the known counter-rotating roll configuration, to receive the severed crop material from the cutterbar 22 and then condition the crop by crushing or crimping the stems thereof.

The header 20 further includes a centrally mounted gearbox 25 operable to receive rotational power from a conventional power-take-off driveline 19 (PTO) rotatably supported by the forwardly extending draft tongue 14 and connectable to the tractor T, as is well known in the art. The gearbox 25 is rotatable about a generally vertical axis defined by the generally upright shaft 26. The purpose of constructing the gearbox 25 to be rotatable is so that the gearbox 25 can follow the transverse pivotal movements of the tongue 14 and keep the universal joints 19a, 19b within acceptable bend angles.

A secondary belt drive mechanism 28 is rotatably driven from the gearbox 25 and transfers rotational power transversely and then downwardly in a generally conventional manner to the cutterbar 22 and rearwardly to power the operation of the conditioning mechanism 24. The belt drive mechanism 28 includes a drive sheave 29 that projects upwardly from the gearbox 25 and is rotatably driven therefrom, but also rotates with the gearbox 25 as the gearbox 25 pivotally rotates to follow the corresponding pivotal movement of the draft tongue 14.

Figure 5:
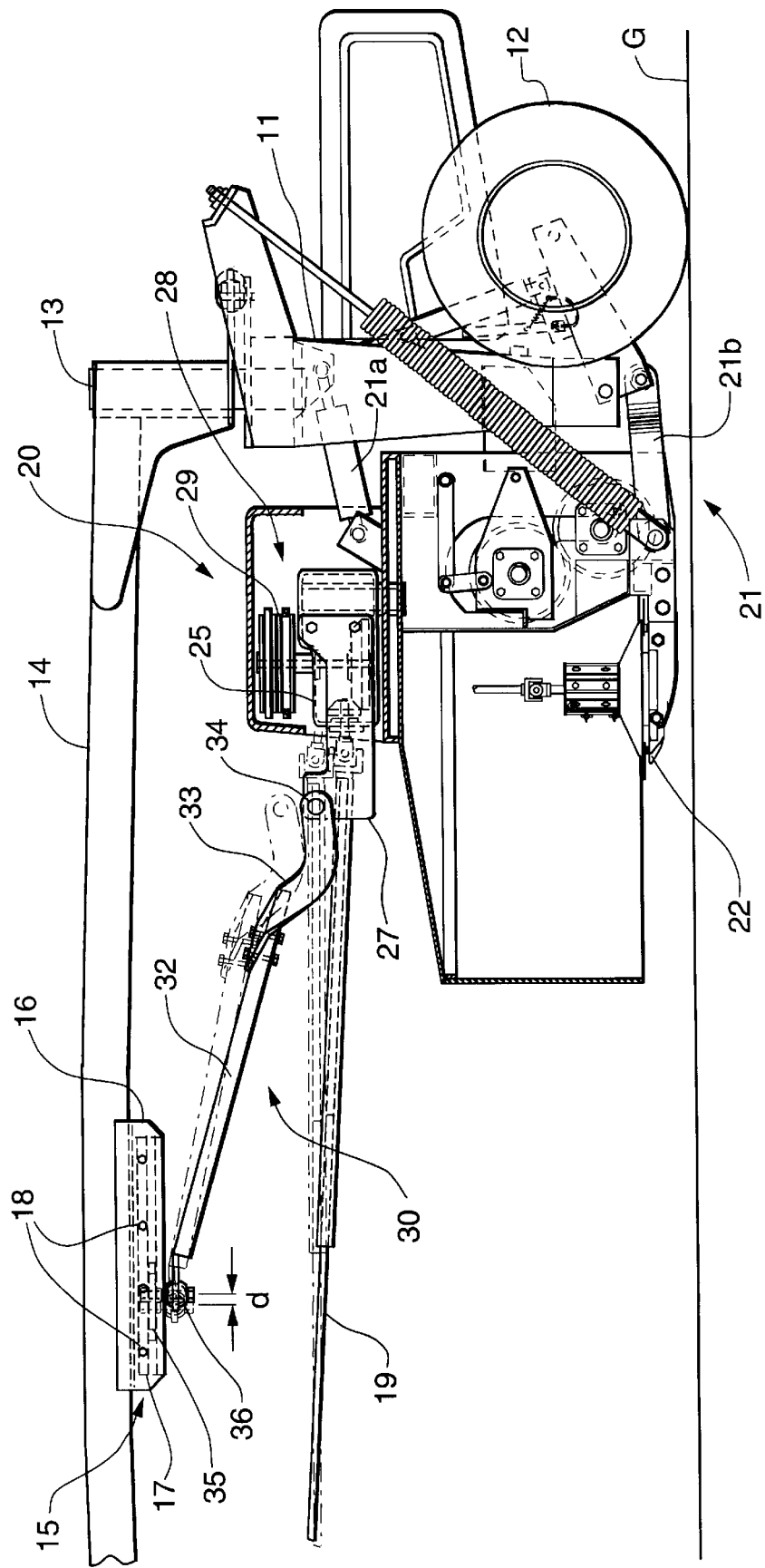
FIG. 5 is a partial left side elevational view of the crop harvesting machine shown in FIG. 1 with the hitch end of the draw bar being broken away for purposes of clarity, the header being lowered into an operative position, the movement of the guide link and the driveline in response to flotational movements of the header being shown in phantom.

The guide link mechanism 30 effects rotation of the gearbox 25 to follow the pivotal movements of the tongue 14 through a guide arm 32 that is connected to the gearbox 25 via a channel-shaped mounting bracket 27 by a yoke 33. The mounting bracket 27 is secured to the gearbox 25 to effect rotational movements therewith. The yoke 33 is pivotally connected to the mounting bracket 27 by the pivot members 34 to permit the guide arm 32 to rotate in a substantially vertical plane as the header moves up and down during harvesting operation, as best seen in FIG. 5.

Figure 6:
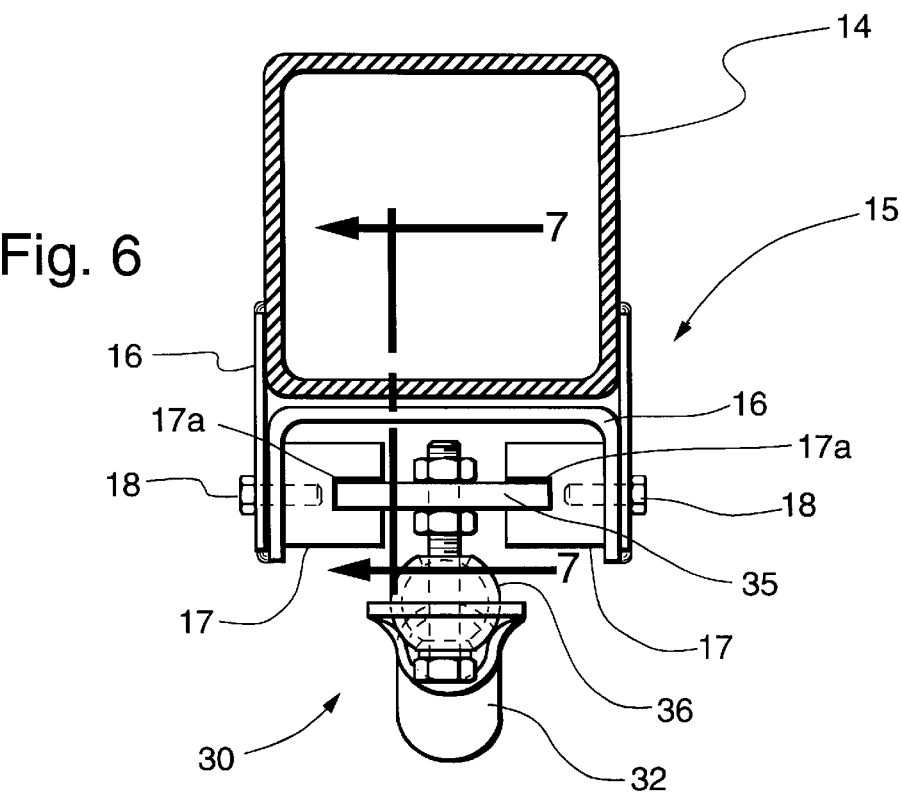
FIG. 6 is an enlarged cross-sectional view taken along lines 6—6 of FIG. 1 to depict a front elevational view of the sliding mechanism.
Figure 7:
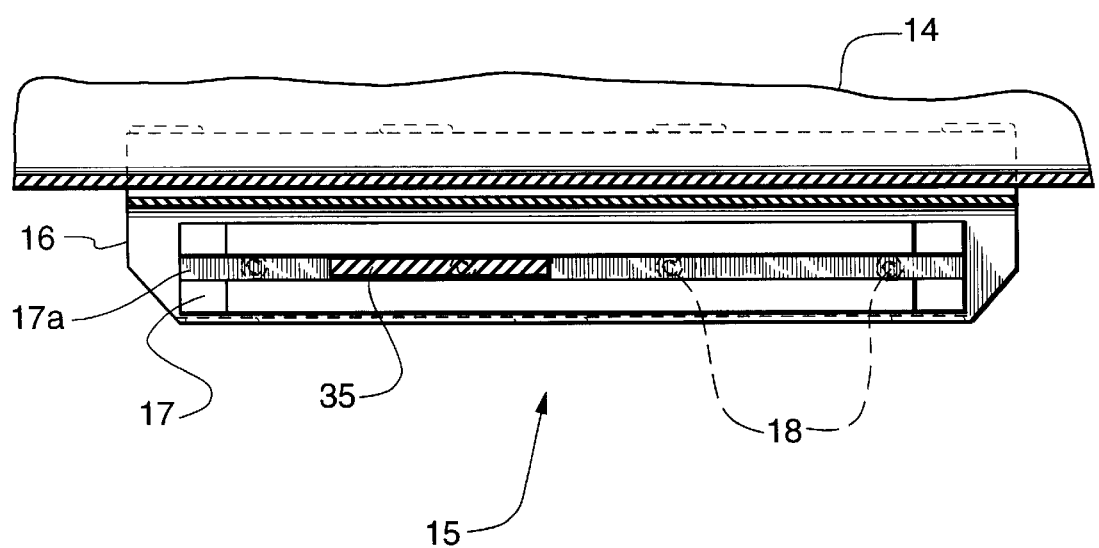
FIG. 7 is a cross-sectional view of the sliding mechanism taken along lines 7—7 of FIG. 6.

As best seen in FIGS. 6 and 7, the guide arm 32 includes a slider plate 35 connected at its forward end by a spherical member or ball joint 36 that permits pivotal movement of the guide arm 32 relative to the slider plate 35 in both vertical and horizontal orientations. The slider plate 35 is supported for sliding movement by an open-ended slider mechanism 15 that includes a channel member 16 fixed, preferably welded, to the underside of the tongue 14. The channel member 16 can incorporate side flanges as shown in the drawings to permit welding to the side of the tongue 14, or be directly welded to the underside of the tongue 14.

Figure 3:
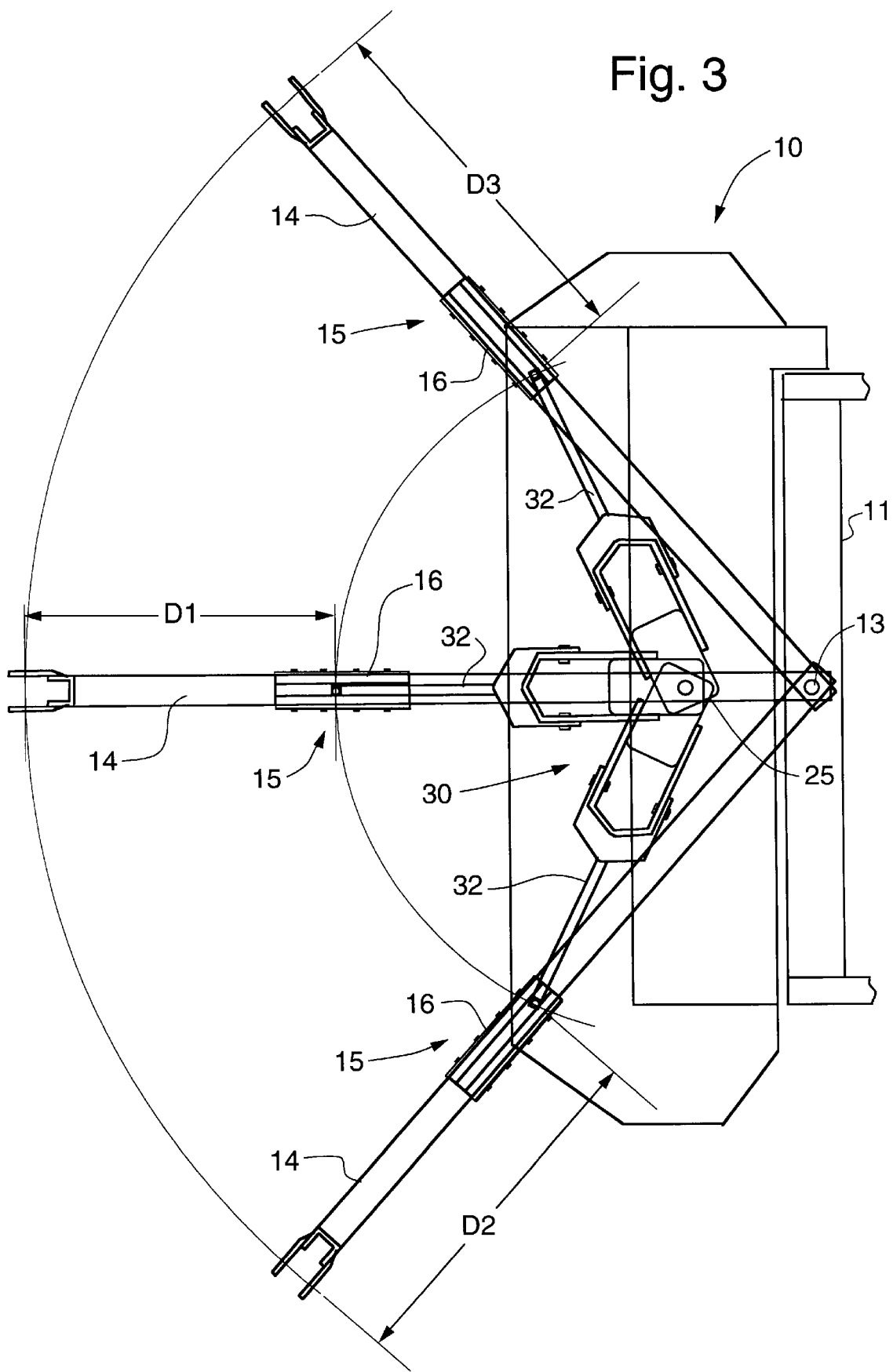
FIG. 3 is an enlarged schematic top plan view of the crop harvesting machine depicting the relative positions of the guide link controlling the pivotal movement of the header gearbox in response to a pivotal movement of the draw bar, the respective arcuate movement of the hitch end of the draw bar and the forward end of the guide link being depicted by arcuate lines.
Figure 4:
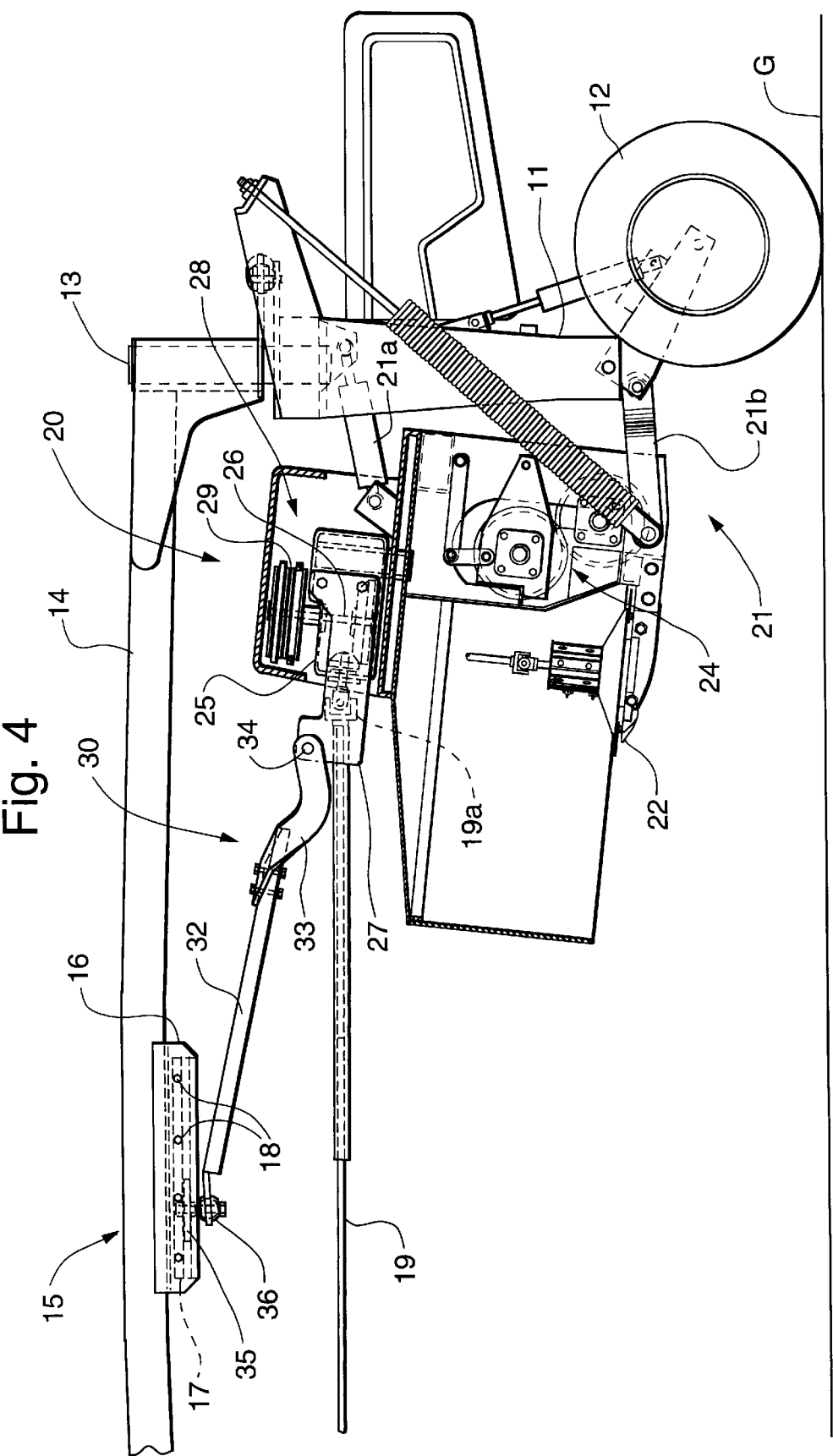
FIG. 4 is a partial left side elevational view of the crop harvesting machine shown in FIG. 1 with the hitch end of the draw bar being broken away for purposes of clarity, the header being raised into a transport position.

The slider mechanism 15 further includes low friction plastic slider blocks 17, preferably constructed of UHMW polyethylene material, detachably connected to the channel member 16 by fasteners 18 so that the slider block members 17 can be replaced easily when required. Shims (not shown) may be necessary to obtain and to maintain the proper alignment between the slider plate 35 and the slider blocks 17. The slider plate 35 is engaged within longitudinally extending grooves 17a in the slider blocks 17 to capture the slider plate 35 for sliding support thereof to facilitate the movement of the slider plate 35 along the length of the slider blocks 17 as the tongue 14 pivotally moves relative to the frame 11 from side to side, as is depicted in FIG. 3.

In operation, the pivotal movement of the tongue 14 changes the horizontal distance between the gearbox 25 and the slider mechanism 15 because of the location of the tongue pivot 13 on the frame 11 being longitudinally spaced relative to the vertical rotational axis of the gearbox 25. Furthermore, the generally vertical movement of the header 25, whether between the transport position shown in FIG. 4 and the operative position shown in FIG. 5, or mere flotational movements corresponding to the header 20 following the surface of the ground G, relative to the frame 11 and the tongue 14 also changes the distance between the gearbox 25 and the channel members 16.

This change in distance is graphically depicted in FIG. 5 in phantom, designated by the reference number "d", and results in the sliding movement of the slider plate 35 on the slider blocks 17. As the distance between the slider mechanism 15 and the gearbox 25 increases the slider plate 35 slides rearwardly relative to the slider blocks 17. As represented in FIG. 3, the transverse pivotal movement of the tongue 14 also increases the distance between the slider mechanism 15 and the gearbox 25, designated distances D1, D2 and D3, which again results in the slider plate 35 moving rearwardly within the slider blocks 17, as compared to the straight forward orientation of the tongue 14.

The vertical movement of the header 20 and attached gearbox 25 relative to the tongue 14 is accommodated by the pivotal connections 34 between the yoke 33 and the channel-shaped mounting bracket 27 and between the guide arm 32 and the slider plate 35, while the changes in distance are translated into sliding movement of the slider plate 35. Likewise, the side-to-side movement of the tongue 14 relative to the gearbox 25, as schematically depicted in FIG. 3, is accommodated by the pivotal movement of the spherical member 36. In practice, the ball joint 36 and the pivot members 34 operate together to accommodate the relative movement of the guide arm 32 relative to the tongue 14 and header 20.

The header 20 is supported from the frame 11 in a conventional manner by a linkage mechanism 21 that includes an adjustable length upper link 21a that can be in the form of a turnbuckle or a hydraulic cylinder that would permit an adjustment of the length of the upper link 21a as the machine 10 is operating. As one skilled in the art will realize, changing the length of the upper link 21a will effect a tilting of the header 20 relative to the frame 11 and the ground G, changing the angle of the cutterbar 22 and the height at which the cutterbar severs the crop from the ground.

The tilting movement of the header 20 to change the cutting angle of the cutterbar 22 also necessitates a movement in the guide link mechanism 30. Since the header tilts about the lower links 21b, the upper portions of the header 20, and the attached gearbox 25, undergo a fore-and-aft movement that translates into a sliding movement of the guide arm 32 along the slider blocks 17. Accordingly, the orientation of the header 20 relative to the ground G, as effected by changing the length of the adjustable upper link 21a, is accommodated within the guide link mechanism 30.

One skilled in the art will recognize a number of operational advantages of the instant invention over the known prior art device. Since the guide arm 32 is of a fixed length, as opposed to a telescopic member, a constant lever length is maintained to control the rotated position of the gearbox 25. Furthermore, the fixed length guide arm 32 does not suffer from a binding of telescopic parts of the arm while they move relative to each other when the header 20 moves up and down. Such a fixed length guide arm 32 also better resists the torque load of the drive mechanism (not shown) within the header 20. The fixed length guide arm 32 is subjected to less forces than a corresponding telescopic device because of the lower resisting forces at the front of the guide arm 32 and due to the low friction phenolic plastic material used in the slider blocks 17.

The wear of the slider blocks 17 and the slider plate 35 can be compensated with shims (not shown) which can be added between the channel members 16 and the slider blocks 17. These shims (not shown) can also be used in the manufacturing process to compensate for manufacturing tolerances and to provide for a proper sliding relationship between the slider blocks 17 and the slider plate 35. Furthermore, the guide arm 32 is easy to install after the manufacturing process. The slider plate 35 is easily positionable in the slider blocks 17 through the open end thereof as the channel members 16 do not provide any structure to keep the slider plate 35 from becoming disengaged from the slider blocks 17.

The plastic slider blocks 17 are constructed from low friction phenolic plastic, preferably UHMW polyethylene, and, therefore, are self-lubricating and self-cleaning. The open ends of the channel member structure 16 permit any debris that might accumulate therein to be discharged as the slider plate 35 moves from one end of the slider blocks 17 to the other. Furthermore, the plastic slider blocks 17 serve to dampen vibrations from the operation of the machine that might resonate through the guide link mechanism 30 to minimize noise levels.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

By way of example, an alternative slider mechanism arrangement could include a low friction, phenolic slide plate 35 that is guided within steel guide members or slider blocks 17. In such a configuration, a steel nut (not shown) could be inserted in the phenolic slide plate 35 during the molding process to enhance the connection of the guide arm 32 thereto. Furthermore, the preferred embodiment described above utilizes a rotatable gearbox 25 that has a secondary belt drive mechanism 28 that is driven by the upwardly extending drive sheave 29. In an alternative embodiment, the secondary drive mechanism could extend below the gearbox 25, requiring the gearbox 25 to be constructed with a rotatable upper portion (not shown) and a fixed lower portion (not shown).

Having thus described the invention, what is claimed is:

1. In a crop harvester having a wheeled frame; a draft tongue pivotally connected to said frame along a longitudinal centerline thereof, said draft tongue being pivotally movable about a first generally vertical pivot axis to opposing sides of said longitudinal centerline and being adapted at a distal end for connection to a prime mover; a drive line supported by said draft tongue to transmit rotational power from said prime mover when coupled thereto; a crop harvesting header suspended from said frame and being forwardly disposed relative thereto for engagement of crop material as said crop harvester is moved forwardly, said crop harvesting header having a cutterbar operable to sever standing crop material as said crop harvester is advanced into standing crop material; a gearbox mounted on said crop harvesting header along said longitudinal centerline forwardly of said first pivot axis and being operatively connected to said cutterbar to deliver operative power thereto, said gearbox being rotatable about a second generally vertical pivot axis, said gearbox being operatively connected to said drive line to receive rotational power therefrom; and a guide link mechanism for effecting rotational movement of said gearbox in response to the pivotal movement of said draft tongue, an improvement to said guide link mechanism comprising:

a yoke portion pivotally connected to said gearbox for pivotal movement about a generally horizontal pivot axis;

a unitary link member having a rearward end attached to said yoke portion and extending forwardly therefrom to a distal forward end; and a slider plate pivotally connected by a ball joint to the forward end of said link member, said slider plate being slidably received within a bracket member affixed to said draft tongue, so that the sliding movement of said slider plate within said bracket accommodates any changes in distance from said bracket to said gearbox due to said draft tongue pivoting about said first pivot axis which is spaced rearwardly from said second pivot axis.

2. The crop harvesting machine of claim 1 wherein said bracket carries an insert apparatus engageable with said slider plate to minimize friction encountered by said slider plate when moving relative to said bracket.

3. The crop harvesting machine of claim 2 wherein said insert apparatus is formed with a pair of opposing fore-and-aft extending grooves for engaging said slider plate and guiding the sliding movement thereof.

4. The crop harvester of claim 3 wherein said grooves are open fore and aft to permit the discharge of any debris accumulating in said grooves upon the sliding movement of said slider plate therein.

5. The crop harvester of claim 4 wherein said insert apparatus is constructed of phenolic material to minimize friction between said slider plate and said insert apparatus.

6. A guide link mechanism associated with a pivotable draft tongue of a crop harvesting machine having a crop harvesting header, including a rotatable gearbox, to effect rotational movement of said gearbox with the pivotal movement of said draft tongue, said tongue having a bracket affixed to the underside thereof forwardly of said gearbox, comprising:

an insert apparatus carried within said bracket;

a slider plate slidably received within said insert apparatus for movement in a fore-and-aft direction relative to said draft tongue; and a unitary link member having a forward end universally pivotally connected to said slider plate and a spaced rearward end pivotally connected to said gearbox for movement relative to said gearbox about a generally horizontally extending pivot axis.

7. The guide link mechanism of claim 6 wherein the rearward end of said link member is attached to a yoke member which is pivotally connected to said gearbox.

8. The guide link mechanism of claim 7 wherein said insert apparatus is formed with a fore-and-aft extending groove therein to slidably receive said slider plate.

9. The guide link mechanism of claim 8 wherein said groove is open fore and aft to permit the discharge of debris therefrom as said slider plate moves therein.

10. The guide link mechanism of claim 9 wherein said insert apparatus is formed from UHMW polyethylene to minimize friction with said slider plate.

11. A crop harvesting machine comprising:

a wheeled frame;

a draft tongue pivotally connected to said frame along a longitudinal centerline thereof, said draft tongue being pivotally movable about a first generally vertical pivot axis to opposing sides of said longitudinal centerline and being adapted at a distal end for connection to a prime mover;

a drive line supported by said draft tongue to transmit rotational power from said prime mover when coupled thereto;

a crop harvesting header suspended from said frame and being forwardly disposed relative thereto for engagement of crop material as said crop harvester is moved forwardly, said crop harvesting header having a cutterbar operable to sever standing crop material as said crop harvester is advanced into standing crop material;

a gearbox mounted on said crop harvesting header along said longitudinal centerline forwardly of said first pivot axis and being operatively connected to said cutterbar to deliver operative power thereto, said gearbox being rotatable about a second generally vertical pivot axis, said gearbox being operatively connected to said drive line to receive rotational power therefrom;

a slider mechanism supported from said draft tongue; and a guide link mechanism pivotally connected to said gearbox and slidably received by said slider mechanism for effecting rotational movement of said gearbox in response to the pivotal movement of said draft tongue, said guide link mechanism including:

a guide arm pivotally connected to said gearbox and extending forwardly therefrom;

a slider plate slidably supported for fore-and-aft movement by said slider mechanism; and a ball Joint interconnecting said slider plate and said guide arm to permit pivotal movement of said guide arm relative to said slider plate.

12. The crop harvesting machine of claim 11 wherein said sliding mechanism comprises:

a channel member fixed to the underside of said tongue; and a pair of plastic slider blocks supported by said channel member to receive said slider plate for a sliding movement of said slider plate relative to said slider blocks.

13. The crop harvesting machine of claim 12 wherein said slider blocks are detachably connected to said channel member by fasteners.

14. An apparatus for effecting a pivotal rotation of a rotatable gearbox mounted on a crop harvesting header supported from a frame of a crop harvesting machine in response to a pivotal movement of a draft tongue having a generally longitudinal length and being pivotally connected to said frame at a first pivot horizontally spaced from said gearbox, said draft tongue having a channel member mounted thereto for pivotal movement with said draft tongue about said first pivot, comprising:

a plastic slide apparatus supported in said channel member;

a guide arm pivotally connected at a rearward end to said gearbox for pivotal movement relative thereto in a generally vertical plane, said guide arm extending forwardly from said gearbox; and a slider plate supported from said plastic slide apparatus for sliding movement relative thereto, said slider plate being connected to a forward end of said guide arm by a ball joint to permit a pivotal movement of said guide arm relative to said slider plate.

15. The apparatus of claim 14 wherein said plastic slide apparatus comprises:

a pair of plastic slider blocks detachably mounted in said channel member being affixed to the underside of said tongue, said slider blocks being oriented to receive said slider plate for a sliding movement thereof along the length of said tongue relative to said slider blocks.

* * * * *